(12) United States Patent
Anders

(10) Patent No.: US 7,650,719 B2
(45) Date of Patent: Jan. 26, 2010

(54) VEHICLE WINDOW SEAL

(75) Inventor: Jens Anders, Marienhagen (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 195 days.

(21) Appl. No.: 11/668,556

(22) Filed: Jan. 30, 2007

(65) Prior Publication Data
US 2007/0180775 A1 Aug. 9, 2007

(30) Foreign Application Priority Data
Feb. 9, 2006 (DE) ...................... 10 2006 006 229

(51) Int. Cl.
*E06B 7/16* (2006.01)
(52) U.S. Cl. ........................ 49/489.1; 49/441
(58) Field of Classification Search ............... 49/489.1, 49/440, 441, 442, 443, 444
See application file for complete search history.

(56) References Cited
U.S. PATENT DOCUMENTS

| 5,001,867 | A | | 3/1991 | Dupuy | |
|---|---|---|---|---|---|
| 5,150,542 | A | * | 9/1992 | Hannya et al. | 49/441 |
| 5,174,066 | A | * | 12/1992 | Dupuy | 49/502 |
| 5,317,835 | A | * | 6/1994 | Dupuy et al. | 49/441 |
| 5,651,217 | A | * | 7/1997 | Mesnel | 49/441 |
| 5,718,084 | A | * | 2/1998 | Takamiya | 49/440 |
| 6,644,718 | B2 | * | 11/2003 | Nozaki | 296/146.9 |
| 6,848,218 | B2 | * | 2/2005 | Langemann | 49/495.1 |
| 7,172,239 | B2 | * | 2/2007 | Nozaki et al. | 296/146.9 |
| 2004/0182010 | A1 | * | 9/2004 | Kalb et al. | 49/441 |
| 2004/0237412 | A1 | * | 12/2004 | Aritake et al. | 49/441 |

FOREIGN PATENT DOCUMENTS

| DE | 39 21 760 C2 | 1/1991 |
|---|---|---|
| DE | 101 31 774 C1 | 6/2002 |
| DE | 102 00 809 A1 | 11/2003 |
| EP | 0 420 617 A1 | 4/1991 |

* cited by examiner

*Primary Examiner*—Gregory J. Strimbu
(74) *Attorney, Agent, or Firm*—Brooks Kushman P.C.

(57) ABSTRACT

A seal includes a body and two lips. The body includes two walls defining a space with an opening. The lips have fixed ends respectively connected to the walls adjacent the opening. A movable end of the first lip is within the space. A movable end of the second lip extends across the opening towards the first lip fixed end. The movable end of the first lip includes a first end portion extending from the first lip fixed end along the first wall to a middle portion extending across the space to a second end portion extending along the second wall towards the second lip fixed end. The second end portion includes a hook section meeting the second wall and the second lip fixed end. The second lip movable end moves into the space and presses the hook section against the second wall to clamp the hook section.

4 Claims, 2 Drawing Sheets

VEHICLE WINDOW SEAL

CROSS-REFERENCE TO RELATED APPLICATIONS

This application claims foreign priority benefits under 35 U.S.C. § 119(a)-(d) to DE 10 2006 006 229.9, filed Feb. 9, 2006, which is hereby incorporated by reference in its entirety.

BACKGROUND OF THE INVENTION

1. Field of the Invention

The present invention relates to seals for frameless vehicle windows.

2. Background Art

DE 101 31 774 C1 describes a seal for a vehicle window. The seal is placed in the window frame of the vehicle. The window is movable between a raised closed position and lowered opened positions. The window inserts into the seal when the window is closed. The seal includes a sealing body having a metallic support. Two mutually facing sealing lips are situated on the sealing body. A side of the sealing body and the sealing lips adjoin a seal receiving space of the seal. The upper end of the window projects into the seal receiving space when the window is closed. Each sealing lip adjoins a respective one of the two side walls of the upper window end when the window is closed to create a sealed closure between the vehicle interior and the external environment.

SUMMARY OF THE INVENTION

An object of the present invention is a seal for a frameless vehicle window which ensures a waterproof and wind-proof closure between the seal and window under high stresses which can occur from wind resistance during rapid vehicle travel.

In carrying out the above object and other objects, an embodiment of the present invention provides a seal for sealing a window having first and second side walls and a leading edge at an upper end. The seal includes a sealing body having a seal receiving space, the seal receiving space having an opening leading out of the sealing body. The seal further includes first and second movable sealing lips each connected at one end to the sealing body on opposite sides of the seal receiving space and bridging the opening of the seal receiving space. The sealing lips each have a free leading end. The first sealing lip is longer than the second sealing lip. The sealing lips move in response to being contacted by the leading edge of the window as the window inserts into the seal receiving space such that upon the window being inserted into the seal receiving space the first sealing lip adjoins the first side wall of the upper end of the window and adjoins the leading edge of the window and the second sealing lip In an embodiment of the present invention, the seal includes first and second flexible sealing lips. The sealing lips are separated components which mutually face one another. Each sealing lip has a free (i.e., non-connected) movable leading end. The other end of each sealing lip is connected to the central sealing body of the seal. The sealing lips and the sealing body are made from a sealing material.

The sealing lips close off the entrance to the seal receiving space of the seal. As the window inserts into the seal receiving space, the first sealing lip adjoins a first one of the two side walls of the upper end of the window and overlaps the leading edge of the upper window end; and the second sealing lip adjoins the second one of the side walls of the upper window end. Thus, the first sealing lip extends over the first side wall of the upper window end and over the leading edge of the upper window end. The window can move into the seal receiving space with relatively little force as the leading edges of the sealing lips are movable to move as the window moves into the seal receiving space.

Accordingly, three linear sealing contacts are made between the seal and the upper window end. The first sealing contact is between the first sealing lip and the first side wall of the upper window end. The second sealing contact is between the second sealing lip and the second side wall of the upper window end. The third sealing contact is between the overlapping portion of the first sealing lip and the leading edge of the upper window end. As a result, seal-tightness against wind and water is improved as compared with an arrangement having only the first and second sealing contacts.

The sealing lips move from their non-contacting starting positions into their sealing positions in which they contact and adjoin the upper window end. The first sealing lip offers minimal resistance to window insertion into the seal receiving space despite the considerable sealing effect it provides by sealing the first side wall of the upper window end and the leading edge of the upper window end. At the same time, the second sealing lip contacts and adjoins the second side wall of the upper window end. As such, the seal seals the two side walls of the upper window end and the leading edge of the upper window end. This sealing provides protection from undesirable deformations, which can occur under high stresses such as high wind resistance at high vehicle speeds. Deformation impairing the sealing effect is prevented by the overlapping section of the first sealing lip even when large forces act on the seal.

The first sealing lip is relatively longer than the second sealing lip. In an embodiment, the first sealing lip is at least twice the length of the second sealing lip. As an example, the first sealing lip is two to five times as long as the second sealing lip. The length of the first sealing lip allows the first sealing lip to lie against the first side wall of the upper window end and the leading edge of the upper window end. Additionally, the length of the first sealing lip allows the first sealing lip to overlap the leading edge of the upper window end and lie against an upper portion of the second side wall of the upper window end. As such, the first sealing lip comes into contact with the second sealing lip which likewise makes sealing contact with a lower portion of the second side wall of the upper window end. As a result, sealing contacts are achieved at the two side walls of the upper window end and at the leading edge of the upper window end when the window is inserted into the seal.

The middle section of the first sealing lip which seals the leading edge of the upper window end includes a depression. The depressed middle section of the first sealing lip is shaped to accommodate the leading edge of the upper window end when the window is inserted into the seal receiving space. The depressed middle section of the first sealing lip reduces the resistance against the insertion motion of the window into the seal receiving space. The window pushes into the depressed middle section of the first sealing lip when closed. Due to the intrinsic elasticity of the sealing material, the first sealing lip stretches as the window inserts into the seal receiving space and makes sealing contact against the side walls and the leading edge of the upper window end. The depressed middle section of the first sealing lip enables the first sealing lip to undergo only relatively slight deformation as the window inserts into the seal receiving space. As a result, in addition to the lowered deformation resistance, the risk of undesired deformation motion outside the provided deformation path is significantly reduced.

In an embodiment of the present invention, one or more of the wall sections of the first sealing lip are tapered to have notches. This enables the first sealing lip to have predetermined bending point(s) which simplify and control the deformation motion of the first sealing lip during insertion of the window into the seal receiving space. A notch may be located in the connecting section of the first sealing lip between the first sealing lip and the central sealing body to form a bending point in this area. A notch may be located in the vicinity of the depression in the first sealing lip to form a bending point in this area. The notches are located on the outer surface of the sealing lip which faces away from the window to ensure linear contact of the first sealing lip against the window.

In an embodiment of the present invention, the free (i.e., non-connected) leading end of the first sealing lip is in the shape of a hook. The central sealing body includes a section which is designed as a receptacle. This section of the central sealing body adjoins the second sealing lip. The hook expediently penetrates into this section of the central sealing body when the upper window end projects completely into the seal receiving space. Since the second sealing lip is deformed by the inserted window, this deformation motion also acts on the hook in the receptacle and the hook under pretension lies against the second sealing lip on the side facing away from the window. The deformation motion of the second sealing lip acts against the pretension of the hook thereby achieving a clamping effect on the hook.

The above features, and other features and advantages of the present invention as readily apparent from the following detailed descriptions thereof when taken in connection with the accompanying drawings.

BRIEF DESCRIPTION OF THE DRAWINGS

A seal for a vehicle window in accordance with an embodiment of the present invention is shown in the drawings in which.

DETAILED DESCRIPTION OF THE PREFERRED EMBODIMENT(S)

Figure 1:
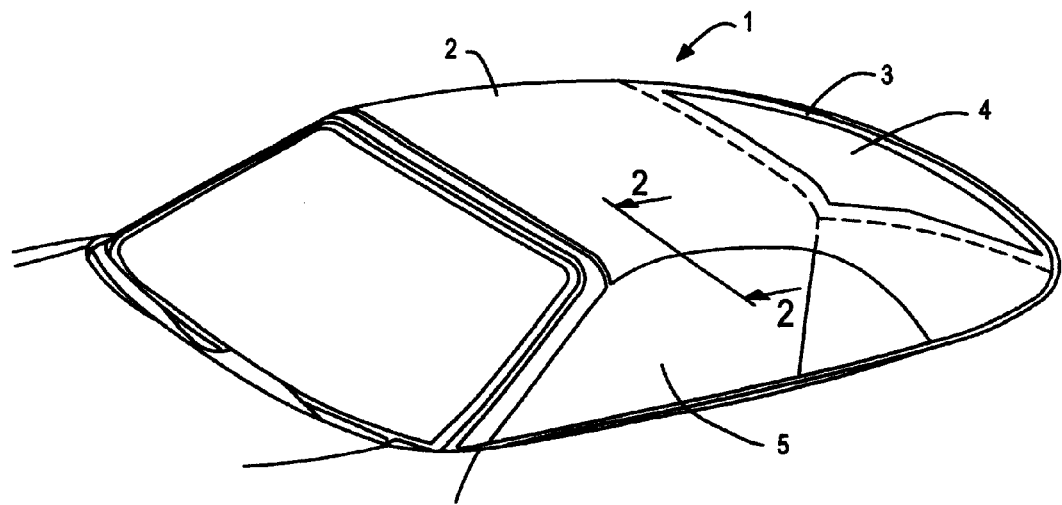
FIG. 1 illustrates a convertible vehicle having a roof and a side window in which the roof has a vehicle window seal in accordance with an embodiment of the present invention.

Referring now to FIG. 1, a convertible vehicle 1 having a roof and a frame-less side window 5 in accordance with an embodiment of the present invention is shown. The roof includes front and rear roof parts 2, 3. The roof may have either a hardtop or soft-top configuration. A rear window 4 is integrated into rear roof part 3. The roof is movable between a closed position in which roof parts 2, 3 cover the vehicle interior and a stored position in which roof parts 2, 3 are stacked upon one another and lowered into the rear storage compartment of the vehicle. Window 5 is movable between a raised closed position and lowered opened positions. The upper end of window 5 faces a lateral, outer section of front roof part 2 when window 5 is closed. The roof and window 5 are closed in FIG. 1.

Figure 2:
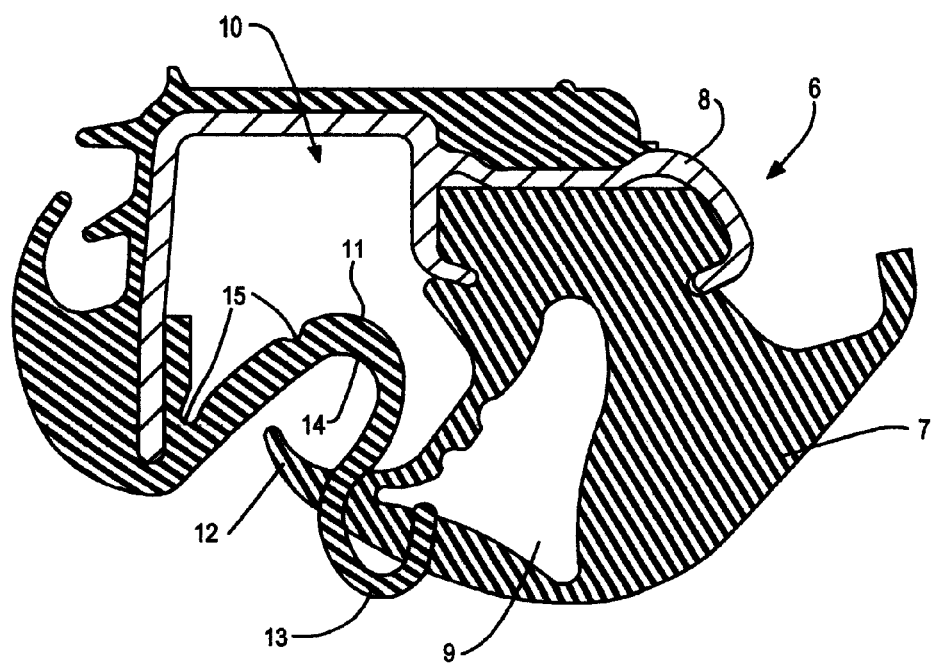
FIG. 2 illustrates two combined cross-sectional views of the seal with the views being along respective sides of the line 2-2 of FIG. 1 in accordance with an embodiment of the present invention.
Figure 3:
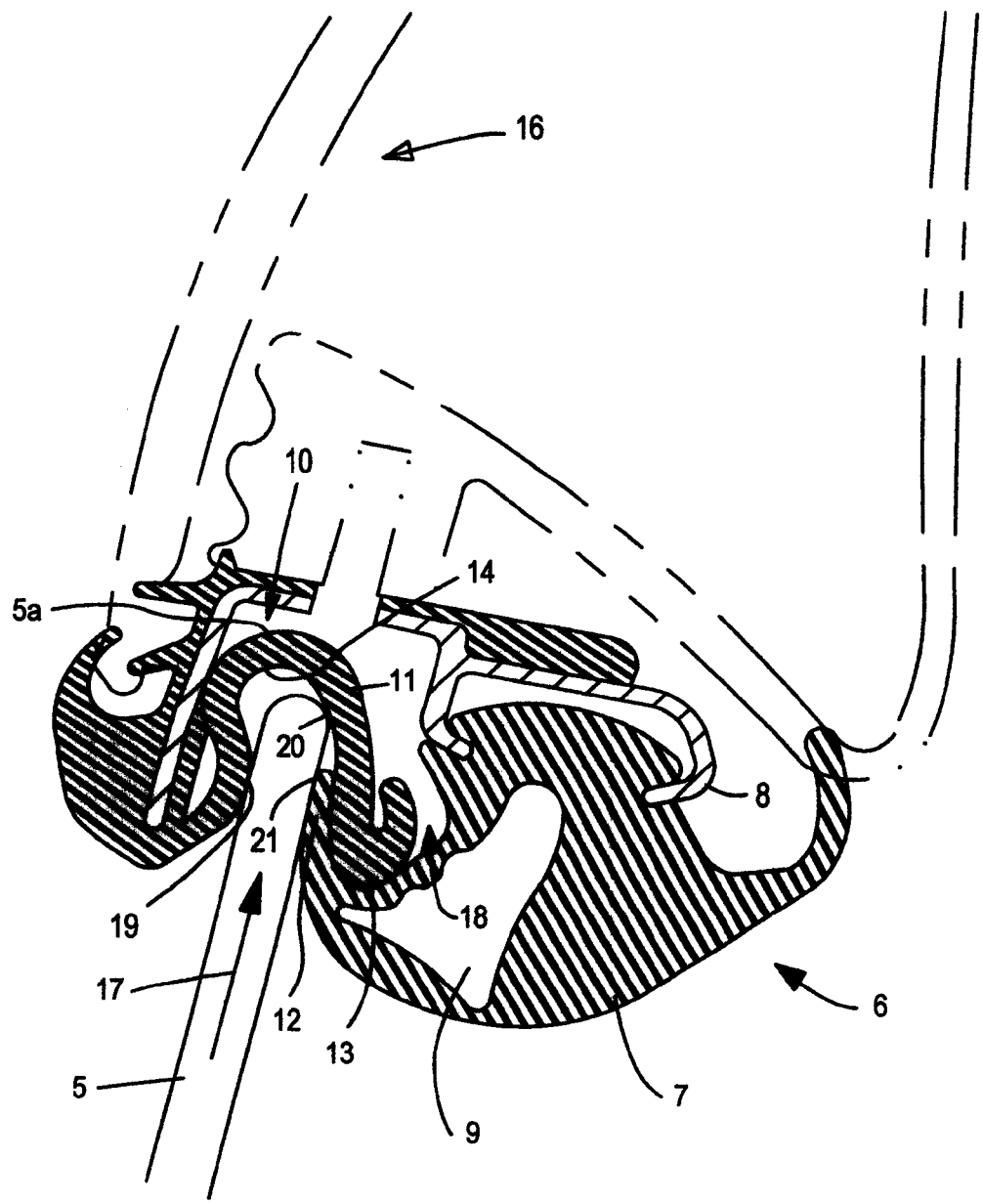
FIG. 3 illustrates a cross-sectional view of the seal and the side window inserted therein.

Referring now to FIGS. 2 and 3, with continual reference to FIG. 1, a seal 6 is integrated into the lateral, outer section of front roof part 2. The upper end of window 5 projects into seal 6 when window 5 is closed. Seal 6 includes a central sealing body 7 made of a sealing material. A support body 8 is introduced into sealing body 7 to stabilize and support sealing body 7. Support body 8 may be made of another material other than the sealing material. For instance, support body 8 may be made from metal, sheet metal, plastic, ceramic, etc. A cutout 9 is provided in sealing body 7 to improve its flexibility.

Sealing body 7 includes a seal receiving space 10. Seal receiving space 10 receives the upper end of window 5 when window 5 is inserted into seal 6. Support body 8 adjoins three of the four sides of seal receiving space 10. The sides of support body 8 adjoining seal receiving space 10 may include the sealing material.

Seal 6 further includes first and second flexible sealing lips 11, 12. Sealing lips 11, 12 are separated sealing lips which branch off from respective ends of sealing body 7 facing seal receiving space 10. Sealing lips 11, 12 mutually face one another and close off the opening, i.e., the fourth side, of seal receiving space 10 when window 5 is opened. Each sealing lip 11, 12 has a free leading end. The free leading ends of sealing lips 11, 12 are not fixedly connected to any other components. As such, sealing lips 11, 12 offer slight resistance to window 5 upon window 5 being inserted into seal receiving space 10.

First sealing lip 11 is shaped such that its middle section has a U-shaped depression 14. Depression 14 faces away from seal receiving space 10. Depression 14 conforms to the shape of the leading edge of the upper end of window 5. The middle section of first sealing lip 11 with depression 14 contacts the leading edge of the upper end of window 5 when window 5 is inserted into seal receiving space 10. First sealing lip 11 is longer than second sealing lip 12. In an embodiment, the length of first sealing lip 11 is approximately two to five times the length of second sealing lip 12.

The free leading end of first sealing lip 11 includes a hook 13. Hook 13 increases the pre-tensioning or internal stress of first sealing lip 11. Hook 13 contacts a section of sealing body 7 within seal receiving space 10 with tensile force when window 5 is inserted into seal receiving space 10.

First sealing lip 11 includes two notches 15 on its side facing seal receiving space 10 (i.e., on its side facing away from the upper window end when window 5 is inserted into seal receiving space 10). One of notches 15, i.e., the first notch, is situated at the point where first sealing lip 11 branches off from central sealing body 7. The other notch 15, i.e., the second notch, is situated at depression 14 of the middle section of first sealing lip 11. Each notch 15 tapers a wall section of first sealing lip 11. As such, each notch 15 has the function of causing a predetermined bending point thereby ensuring that first sealing lip 11 lies against both side walls of the upper end of window 5 as well as the leading edge of the upper end of window 5 when window 5 is inserted into seal receiving space 10 (see FIG. 3).

FIG. 3 illustrates a cross-sectional view of seal 6 with window 5 inserted therein. Seal 6 is installed on a frame element 16 of the lateral, outer section of front roof part 2. Window 5 moves along direction 17 to insert into seal receiving space 10. Upper leading edge 5a of window 5 contacts depression 14 of the middle section of first sealing lip 11 as window 5 inserts into seal receiving space 10.

As a result of the insertion motion of window 5 into seal receiving space 10, the middle section of first sealing lip 11 is displaced in the direction of the adjacent base of seal receiving space 10 but does not contact the base. First sealing lip 11 lies against a first side wall of the upper end of window 5 along a first sealing contact 19. Further, first sealing lip 11 lies against upper leading edge 5a of window 5 along a second sealing contact 20. Second sealing lip 12 lies against the oppositely situated second side wall of the upper end of window 5 along a third sealing contact 21. Hook 13 at the end-face region of first sealing lip 11 lies with pretension against the back side of second sealing lip 12 facing away from window 5. As such, first sealing lip 11 is an overlapping sealing lip in that it lies against the first side wall of the upper end of window 5, upper leading edge 5a of window 5, and an upper portion of the second side wall of the upper end of window 5.

Seal 6 further includes a receptacle cavity 18 near seal receiving space 10. Central sealing body 7 adjoins a portion of receptacle cavity 18. When window 5 is inserted into seal receiving space 10, hook 13 at the leading end of first sealing lip 11 is located in receptacle cavity 18. Further, when window 5 is inserted into seal receiving space 10, second sealing lip 12 is bent back by the inwardly projecting window 5 and adjoins another portion of receptacle cavity 18. As a result, second sealing lip 12 is pressed against the pre-tensioning force of hook 13 which thereby stabilizes first sealing lip 11.

The overlapping function of first sealing lip 11 offers an additional sealing contact (i.e., the sealing contact between first sealing lip 11 and leading edge 5a of window 5) which improves seal-tightness. Despite the improved seal-tightness, a high degree of movability is ensured due to the relatively large length of first sealing lip 11 such that minimal insertion forces are required to insert window 5 into seal receiving space 10 and, in addition, a tolerance compensation is provided with respect to the various insertion angles at which window 5 can insert into seal 6.

LIST OF REFERENCE NUMERALS

1 Vehicle
2 Front roof part
3 Rear roof part
4 Rear window
5 Side Window
5a Upper leading edge of side window
6 Seal
7 Central sealing body
8 Support body
9 Cut-out
10 Seal receiving space
11 First sealing lip
12 Second sealing lip
13 Hook
14 Depression
15 Notch
16 Frame element
17 Arrow direction
18 Receptacle cavity
19 First sealing contact
20 Second sealing contact
21 Third sealing contact While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A seal comprising:

a sealing body having first and second opposite side walls defining a portion of a receiving space having an opening;

a first sealing lip having a fixed end and a movable end, wherein the fixed end of the first sealing lip is connected to the first side wall of the sealing body adjacent to the opening and the movable end of the first sealing lip is within the receiving space; and a second sealing lip having a fixed end and a movable end, wherein the fixed end of the second sealing lip is connected to the second side wall of the sealing body adjacent to the opening and the movable end of the second sealing lip extends across a portion of the opening towards the fixed end of the first sealing lip, wherein the first sealing lip is longer than the second sealing lip;

wherein the movable end of the first sealing lip includes a first end portion, a middle portion, a second end portion, and a U-shaped hook section, the first end portion extending from the fixed end of the first sealing lip away from the opening along the first side wall of the sealing body to the middle portion, the middle portion being disposed away from the opening and extending from the first end portion across the receiving space toward the second side wall of the sealing body to the second end portion, and the second end portion extending from the middle portion towards the fixed end of the second sealing lip;

the U-shaped hook section having a first leg, a middle segment, and a second leg, the first leg extending from the second end portion of the movable end of the first sealing lip towards the fixed end of the second sealing lip, the middle segment extending from the first leg towards the second side wall of the sealing body to the second leg and directly engaging the fixed end of the second sealing lip, and the second leg extending from the middle segment away from the opening along the second side wall of the sealing body:

wherein, in response to a window being inserted through the opening into the receiving space, the movable end of the second sealing lip moves into the receiving space and the first leg of the U-shaped hook section is moved towards the second side wall of the sealing body such that the second leg of the U-shaped hook section is pressed against and directly engages the second side wall of the sealing body whereby the U-shaped hook section is clamped in place between the fixed and movable ends of the second sealing lip and the second side wall of the sealing body.

2. The seal of claim 1 wherein:

the middle portion of the movable end of the first sealing lip is U-shaped.

3. The seal of claim 2 wherein:

the U-shaped middle portion is opened towards the opening.

4. The seal of claim 1 wherein:

the movable end of the first sealing lip includes a tapered wall section where the middle portion extends from the first end portion, wherein the tapered wall section forms a predetermined bending point.

* * * * *